April 4, 1967  P. J. SACKETT  3,312,530
AMMONIATOR-GRANULATOR APPARATUS
Filed Jan. 8, 1964  2 Sheets-Sheet 2

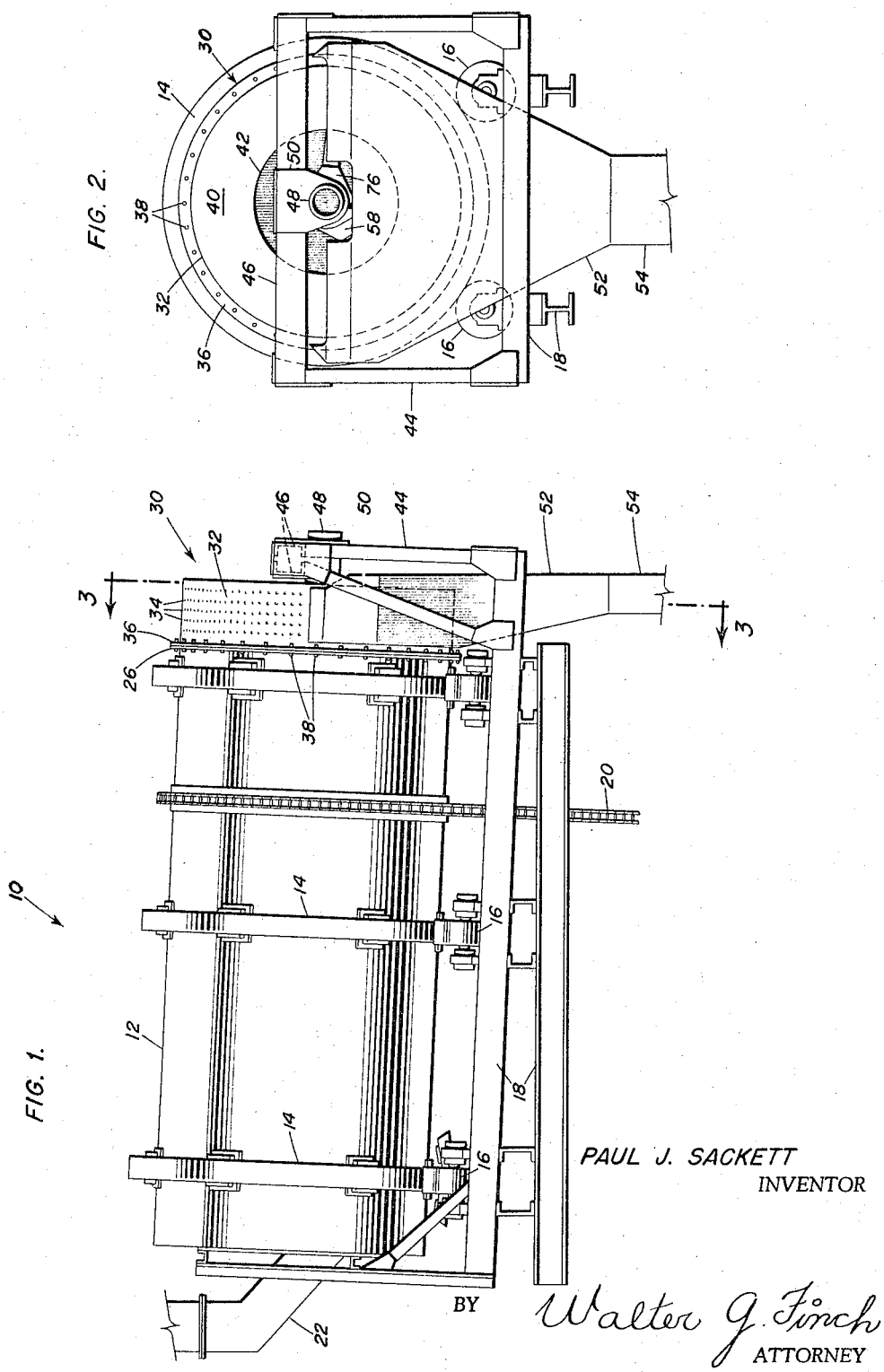

INVENTOR
PAUL J. SACKETT

BY Walter G. Finch
ATTORNEY

United States Patent Office 3,312,530
Patented Apr. 4, 1967

3,312,530
AMMONIATOR-GRANULATOR APPARATUS
Paul J. Sackett, Baltimore, Md., assignor to The A. J. Sackett & Sons Company, Baltimore, Md., a corporation of Maryland
Filed Jan. 8, 1964, Ser. No. 336,464
7 Claims. (Cl. 23—259.1)

This invention relates generally to plant food processing apparatus, and more particularly it pertains to an improved ammoniator-granulator apparatus for the manufacture of plant food, such as chemical fertilizer and the like. Although this invention is illustrated in connection with apparatus for the manufacture of fertilizer, it is not limited thereto as it can be readily adapted for other kinds of materials which have to be granulated or pelletized.

The quality of manufactured chemical fertilizers is enhanced by the uniformity of its granule size. For this reason, considerable recycling of the fines and the oversize particles is at present required with a corresponding increase in the cost of manufacture thereof.

It is an object of this invention, therefore, to provide an ammoniator-granulator which delivers a more uniformly-sized product wherein all oversize lumps are reduced to an acceptable size directly from the machine without recycling.

Another object of this invention is to provide a granule forming attachment for the granulator which can be readily changed for any size of granule desired and which continuously clears itself in operation.

Other objects and attendant advantages of this invention will become more readily apparent and understood from the following detailed specification and accompanying drawings in which:

FIG. 1 is a side elevation of an ammoniator-granulator apparatus embodying features of this invention;

FIG. 2 is an end elevation of the apparatus of FIG. 1;

Figure 5:
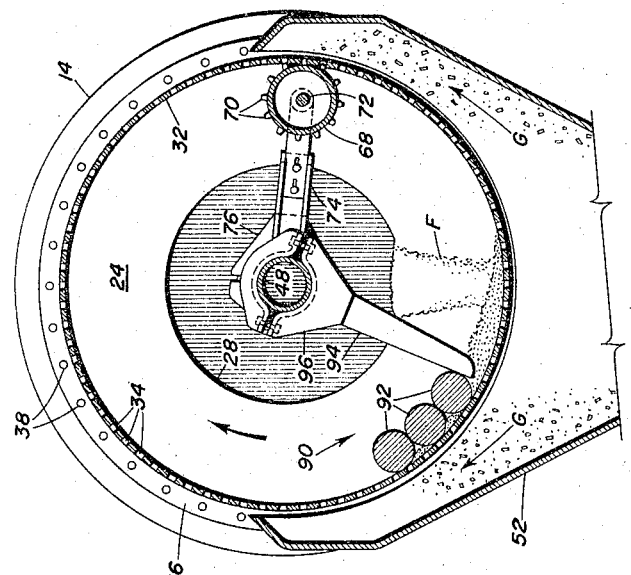
FIG. 5 is a view similar to FIG. 3, but embodying a modification form of the invention.
Figure 3:
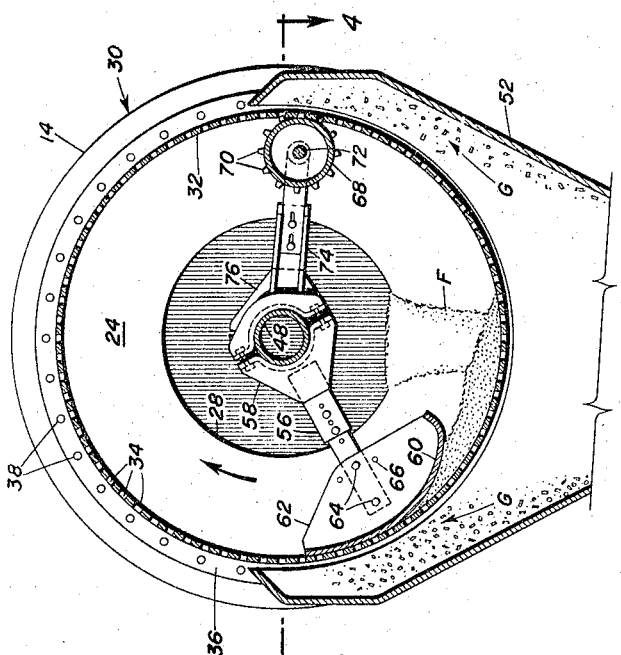
FIG. 3 is a vertical section taken on line 3—3 of FIG. 1.
Figure 4:
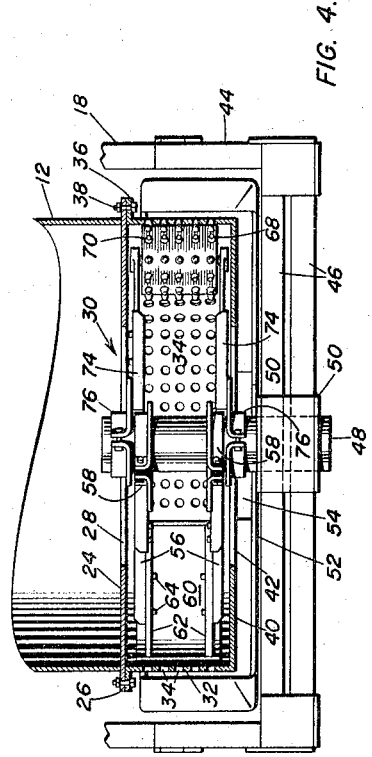
FIG. 4 is a horizontal section taken on line 4—4 of FIG. 3.

Referring now to the details of the drawings as shown in FIGS. 1, 2, 3, and 4, there is shown depicted generally an ammoniator-granulator apparatus 10 as described in U.S. Letters Patent No. 3,022,142, issued Feb. 20, 1962, to Walter J. Sackett, Sr., for "Ammoniator-Granulator Apparatus." This ammoniator-granulator apparatus 10 comprises a cylindrical chamber or drum forming an ammoniator 12 and a granulator 30. The chemical reaction of ammoniating a phosphate takes place in the ammoniator 12. The ammoniator drum 12 is provided with rings 14 which support it upon rollers 16.

The rollers 16 are mounted upon a supporting framework 18 which inclines the ammoniator drum 12 so that raw ingredients from a supply chute 22 at one end are mixed and slowly propelled toward the other end as rotation is applied from a drive chain 20. The lower end of drum 12 is provided with an end wall 24 which extends radially to form a flange 26. The center of this end wall 24 has a circular opening 28 from which the mixed ammoniated fertilizer mixture F pours into a second chamber or the granulator 30.

This granulator 30 consists of a cylinder 32 whose wall has a plurality of regularly spaced perforations 34. A flange 36 is formed on one end of the cylinder 32 and is thereby secured by bolts 38 to the previously-mentioned end flange 26 of the drum 12. The other end of cylinder 32 is provided with an endwall 40 having a central opening 42.

A crossbeam 46 extends across the face of the endwall 40, and it is supported on a framework 44 which extends upwardly from the lower end of the main frame 18. A stub support or tube 48 is secured by brackets 50 to the crossbeam 46 and extends through the endwall opening 42 to the interior of the cylinder 32.

A discharge hopper or funnel 52 is also mounted on the framework 44 so as to closely embrace the lower half of the cylinder 32. A discharge chute 54 leads away from the bottom of the funnel 52.

Inside of the cylinder 32, adjustable legs 56 extend radially outward from the tube 48 and are secured thereto by clamps 58. A shoe or wiper plate 60 of somewhat more arcuate shape than the radius of the cylinder 32 is mounted by bolts 64 so as to bear against an area of perforations 34 and it is tilted contrary to the direction of rotation (arrow) of the drums 12. Several adjustment holes 66 are provided to permit the tilt of the wiper plate 60 to be varied.

A roller 68 having protuberances 70 is spaced so as to register with the perforations 34 and engage therewith. The roller 68 is journalled on a shaft 72. This shaft 72 is mounted on the end of adjustable legs 74 which extend radially from and are secured to the tube 48 by clamps 76.

In operation, the mixed and reacted fertilizer F emerges from the reactor drum 12 onto the perforations 34. The oversize particles cannot fall through and are carried under the arcuate shoe or plate 60 which remains stationary while the cylinder 32 turns. Thus these large particles are forced against the perforations 34 to be reduced in size and pressed through as granules G into the hopper or funnel 52 to join those which passed by their own accord.

To clear the perforations 34 of retained granules, the roller 68 operates continuously probing each by means of the protuberances 70. It also receives its rotary power in gear-like fashion from this intermeshing of the protuberances and perforations 70 and 34, respectively.

FIG. 5 illustrates a modified granulator 90 wherein the shoe or wiperplate 60 is replaced by a set of free rollers 92 (spheres may be used instead if desired) which extend the width of the cylinder 32. In the case of the wiperplate 60, it is impossible for an occasional extremely large particle or lump to pass under the rollers 92 despite any setting of the tilt adjustment. The rollers, 92, however, adapt themselves to any sizes and even allow themselves to be pushed to a degree in the direction of drum rotation until the lump is crushed whereupon the rollers 92 fall back to normal position. This position is defined by a roller stop 94 which is adjustably mounted on the stub tube 48 by clamps 96.

Obviously many modifications and variations of the present invention are possible in light of the above teachings. It is, therefore, to be understood that within the scope of the appended claims the invention may be practiced otherwise than as specifically described.

What is claimed is:

1. Apparatus for the sizing of granular material, comprising, structure defining a cylindrical chamber for receiving said granular material and having perforations uniformly spaced along the lateral surface thereof for sizing said granular material, means pressing said granular material against said perforations, clearing means including an element rotatably positioned within said chamber and having protuberances engaging the perforations thereof for clearing said perforations of said granular material, and means rotating said chamber on its longitudinal axis with respect to said pressing means and said clearing means.

2. The apparatus as recited in claim 1, wherein said pressing means includes a wiper plate.

3. The apparatus as recited in claim 1, wherein said pressing means includes a plurality of rollers and a member retaining said rollers from passing a predetermined position within said cylindrical chamber.

4. The apparatus as recited in claim 3, wherein said predetermined position prevents said rollers from substantial rolling counter the rotation of said cylindrical chamber.

5. The apparatus as recited in claim 1 wherein a tube member is mounted within said cylindrical chamber and extends along the length thereof and a pair of leg members are secured to said tube member and extending radially therefrom, with said pressing means being positioned by one of said leg members and said clearing means being positioned by the other of said leg members.

6. The apparatus as recited in claim 1 wherein said clearing means is positioned on the downward rotational side of said cylindrical chamber.

7. The apparatus as recited in claim 3 wherein said rollers are free.

References Cited by the Examiner
UNITED STATES PATENTS

| | | | |
|---|---|---|---|
| 2,887,718 | 5/1959 | Curran et al. | 264—13 |
| 2,933,377 | 4/1960 | Doubt et al. | 18—12 |
| 3,063,361 | 11/1962 | Gerhke. | |
| 3,239,314 | 3/1966 | Sackett | 23—259.1 |

MORRIS O. WOLK, *Primary Examiner.*

JAMES H. TAYMAN, JR., *Examiner.*